US012412555B1

(12) United States Patent
Matthews

(10) Patent No.: US 12,412,555 B1
(45) Date of Patent: Sep. 9, 2025

(54) SYSTEM AND METHOD FOR TONE THRONE PERCUSSIVE GUITAR STOOL

(71) Applicant: David C. Matthews, Sharon Hill, PA (US)

(72) Inventor: David C. Matthews, Sharon Hill, PA (US)

(*) Notice: Subject to any disclaimer, the term of this patent is extended or adjusted under 35 U.S.C. 154(b) by 0 days.

(21) Appl. No.: 18/586,931

(22) Filed: Feb. 26, 2024

Related U.S. Application Data

(60) Provisional application No. 63/448,039, filed on Feb. 24, 2023.

(51) Int. Cl.

| | |
|---|---|
| ***G10H 1/34*** | (2006.01) |
| ***A47C 7/72*** | (2006.01) |
| ***A47C 9/08*** | (2006.01) |
| ***G10H 1/00*** | (2006.01) |

(52) U.S. Cl.
CPC ............... *G10H 1/348* (2013.01); *A47C 7/72* (2013.01); *A47C 9/08* (2013.01); *G10H 1/0008* (2013.01); *G10H 2220/265* (2013.01)

(58) Field of Classification Search
CPC ................. G10H 1/348; G10H 1/0008; G10H 2220/265; A47C 7/72; A47C 9/08
See application file for complete search history.

(56) References Cited

U.S. PATENT DOCUMENTS

| | | | | |
|---|---|---|---|---|
| 2,367,052 | A | 1/1945 | Rentie | |
| 7,074,997 | B2 | 7/2006 | Steele | |
| 7,470,847 | B2 | 12/2008 | Kitagawa | |
| 8,263,848 | B2 | 9/2012 | Aspland | |
| 8,546,678 | B1 | 10/2013 | Stevens | |
| 8,624,097 | B1 | 1/2014 | Liao | |
| 8,802,962 | B2 | 8/2014 | Gulak | |
| 9,286,875 | B1 * | 3/2016 | Kerr | G10D 13/26 |
| 10,043,506 | B2 | 8/2018 | Soda | |
| 10,366,683 | B2 | 7/2019 | Iio et al. | |

(Continued)

FOREIGN PATENT DOCUMENTS

| | | | |
|---|---|---|---|
| BR | 102018069299 | A2 | 3/2020 |
| GB | 2481052 | A | 12/2011 |

(Continued)

OTHER PUBLICATIONS

"ThePedalGuy Previews The QuantumLoop Pedal by Ortega Guitars," youtube.com. https://www.youtube.com/watch?v=BT_jnWqG9KQ [Date accessed: Oct. 13, 2022].

(Continued)

*Primary Examiner* — Jeffrey Donels
(74) *Attorney, Agent, or Firm* — Bold IP, PLLC; Christopher Mayle

(57) ABSTRACT

A system and method for a stool with foot pedals that generate electronic drum sounds, whereby the stool includes a seat supported by a base and footstool, and two foot pedals attached to the footstool on either side of the seat, whereby foot pedals are capable of being pressed to generate electronic drum sounds, whereby the foot pedals are connected to an electronic control system that generates the electronic drum sounds such that electronic control system can be programmed to produce a wide range of drum sounds, from traditional acoustic drum sounds to more experimental electronic drum sounds.

20 Claims, 8 Drawing Sheets

(56) References Cited

U.S. PATENT DOCUMENTS

| | | | | |
|---|---|---|---|---|
| 10,741,154 | B2 | 8/2020 | Packouz | |
| 2001/0008100 | A1 * | 7/2001 | Devecka | G10H 1/0016 84/738 |
| 2010/0180750 | A1 * | 7/2010 | Steele | G10H 1/32 84/422.3 |
| 2011/0132181 | A1 * | 6/2011 | Kockovic | G10H 1/34 84/723 |
| 2018/0330700 | A1 | 11/2018 | Bardin | |
| 2021/0312894 | A1 | 10/2021 | Wening | |

FOREIGN PATENT DOCUMENTS

| | | | | |
|---|---|---|---|---|
| JP | 2016007438 | A * | 1/2016 | |
| WO | WO-9621924 | A1 * | 7/1996 | G10H 1/348 |

OTHER PUBLICATIONS

"DIY Stomp Box / Foot Drum . . . New version 4.1!," youtube.com. https://www.youtube.com/watch?v=Aq4giX8sZY0 [Date accessed: Oct. 13, 2022].

"The Floordrum—Live Foot Drum Percussion—Multiple Stomp Box—Ideal for One Man Band Busking," youtube.com. https://www.youtube.com/watch?v=XD5-RK3I5sM [Date accessed: Oct. 13, 2022].

* cited by examiner

SYSTEM AND METHOD FOR TONE THRONE PERCUSSIVE GUITAR STOOL

CROSS REFERENCE TO RELATED APPLICATIONS

This application claims priority to U.S. Provisional Patent Application No. 63/448,039 filed on Feb. 24, 2023, which is incorporated in its entirety.

FIELD OF DISCLOSURE

The overall field of this invention is a system and method for a portable stool and more specifically to a portable stool with built in audio control devices to produce drum sounds to back up a singer or guitarist.

BACKGROUND

Playing multiple instruments at once can be challenging as it requires coordination, dexterity, and a good understanding of the instruments. Additionally, playing multiple instruments simultaneously demands a high level of musical ability and attention, as well as the ability to switch quickly and smoothly between the instruments. When a solo musician is playing live, it is difficult to keep time or add some percussion to the song without using pre-programmed drumbeats from a drum machine or bringing a drummer along to play a large drum kit. For a number of years now, some musicians have used devices to tap their foot, but this does not give any other tonal options to the musician. Thus, there is a need for an electronic percussion instrument with tonal options that is easy and natural to play while playing a guitar or another instrument.

SUMMARY

The present invention provides a stool with foot pedals that generate electronic drum sounds. The stool comprises a seat supported by a base and footstool, and two foot pedals attached to the footstool on either side of the seat. The foot pedals are capable of being pressed to generate electronic drum sounds. The stool is designed to provide musicians with a more immersive and interactive drumming experience. The foot pedals are connected to an electronic control system that generates the electronic drum sounds. The electronic control system can be programmed to produce a wide range of drum sounds, from traditional acoustic drum sounds to more experimental electronic drum sounds. The electronic control system can also be programmed to generate different drum sounds in response to different modes selected by the musician, allowing musicians to create dynamic and expressive performances.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
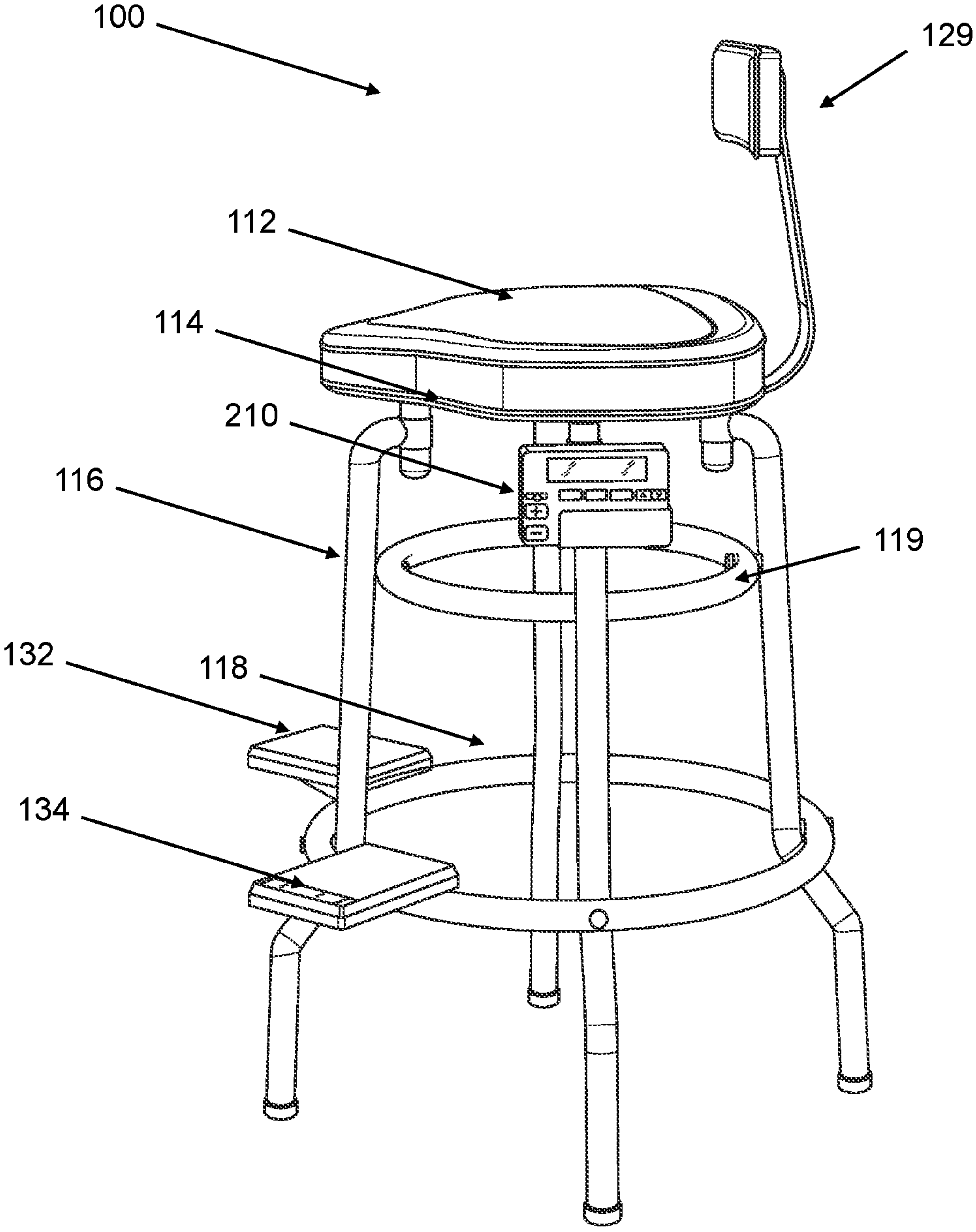
FIG. 1 is a perspective view of the embodiment of the stool.

The present invention is directed to a stool in which the musician sits upon and plays their stringed instrument while playing "drums" or keeping rhythm with the feet. A choice of sounds for each foot (trigger) may be selected from a dial within the sound selector control module on each side of the cushion. When the triggers are tapped with the feet, the percussion sound signals are sent to a power/output box located on the lower back side of the rear leg of the stool. XLR or ¼ inch instrument cables plug into the output box and subsequently plugged into the PA mixer. An AC cable may be attached to the bottom of the output box as well to avoid the use of batteries and to keep from any tripping accidents. A built in looper may be activated by holding down the right trigger for one and a half to two seconds. Conversely, holding the left trigger down will turn off the loop. The purpose of the present invention is to assist the musician with percussive rhythm without needing a drummer or drum machine.

One non-limiting embodiment of music device 100 in accordance with the present invention is illustrated in FIG. 1-6. In this embodiment, music device 100 may include a stool 110. Stool 110 may include seat 112, a base 114, legs 116, a footrest 118, a right foot trigger 132 and left foot trigger 134, and in some embodiments a right control switch and left control switch. Seat 112 may be the part of the stool that provides a place for a person to sit. Seat 112 may be made of a flat surface that is cushioned and covered with a material such as wood, plastic, or fabric. Base 114 may be the part of the stool that supports seat 112 and legs 116 whereby base 114 is positioned directly under seat 112. Base 114 may made of a sturdy material such as metal or wood and is connected to legs 116, which provide stability to the stool. A backrest 129 may extend upward and backward from base 114 so as to support the back of the user. Legs 116 of stool 110 may be straight or angled and may be connected to base 114 with screws or other fastening devices. Footrest 118 may be a small circular platform located near a bottom of the stool and may provide additional support and comfort to the feet while sitting on the stool. Footrest 118 may be made of the same material as base 114. A second ring 119 may be positioned above footrest 118 to provider more support.

In this exemplary embodiment, music device 100 includes a power source positioned inside or under the base, in this case battery enclosed within an enclosed space and being accessible for removal and replacement of a battery by a removable battery access cover.

Right foot trigger 132 and left foot trigger 134 may be disposed on footrest 118 just in front of stool 110. Right foot trigger 132 may be positioned to underlie the right foot of the musician and left foot trigger 134 may be positioned to underlie the left foot of the musician. Right foot trigger 132 and left foot trigger 134 may be flat so that it fits substantially flush to footrest 118. Alternatively, they may be wedge-shaped or otherwise shaped to enhance the comfort of a musician during play. A musician can thus "play" the foot triggers as if they were simply striking footrest 118 with their feet. This has been found to be a natural, more accurate, and less fatiguing method of playing than the traditional technique of raising the entire foot and leg to operate a standard kick drum pedal during play.

Right foot trigger 132 and left foot trigger 134 may be connected to a piezoelectric transducer or any suitable trigger device or sound-receiving unit capable of translating a mechanical signal (e.g., vibration of the foot triggers) into an electrical (analog or digital) sound signal. When a mechanical force is applied to a piezoelectric material such as the musician striking right foot trigger 132 and left foot trigger 134, it causes the crystal lattice structure to deform, which results in the creation of an electrical charge on the surface of the material. This charge can be measured as a voltage and can be used to produce an electrical current. In one non-limiting embodiment, the transducer may instead be a force sensing resistor ("FSR") capable of producing differing voltages as force is applied to the sensor.

The resulting trigger signal from the transducer is intended to be received by a sound module 210 adapted to generate signals representing a sound output or desired sound effect or other action. The generated electrical signal is transmitted via cables (or in some cases wirelessly) to sound module 210. Each foot trigger may be connected to its own input on sound module 210, allowing it to recognize which foot trigger was struck. Sound module 210 receives signals from the foot triggers when they are struck and translates these into sounds. Sound module 210 includes a variety of pre-set drum and percussion sounds allowing for extensive customization and creation of custom kits. The sound module's software may interpret the signal based on its intensity and where the foot trigger was struck.

Sound module 210 may have a series of computing devices and may be in the form of, a circuit board, a memory or other non-transient storage medium in which computer-readable coded instructions are stored and one or more processors configured to execute the instructions stored in the memory. Sound module 210 may have a wireless transmitter, a wireless receiver, and a related computer process executing on the processors.

Computing devices of sound module 210, may be any type of computing device that typically operate under the control of one or more operating systems, which control scheduling of tasks and access to system resources. Computing devices may be a Raspberry Pi® or other computing devices such as but not limited to a phone, tablet, desktop computer, laptop computer, gaming system, networked router, networked switch, networked, bridge, or any computing device capable of executing instructions with sufficient processor power and memory capacity to perform operations of control system.

Sound module 210 may include control circuitry and one or more microprocessors or controllers acting as a servo control mechanism capable of receiving input from the foot triggers and the control switches, analyzing the input and generating an output signal. Sound module 210 may include digital signal processors (DSPs) that are optimized for tasks such as generating and modifying sounds, applying effects, and managing audio outputs. Sound module 210 may include one or more databases 215 for storing recording performances, loading additional sound samples, or saving custom settings.

Figure 7:
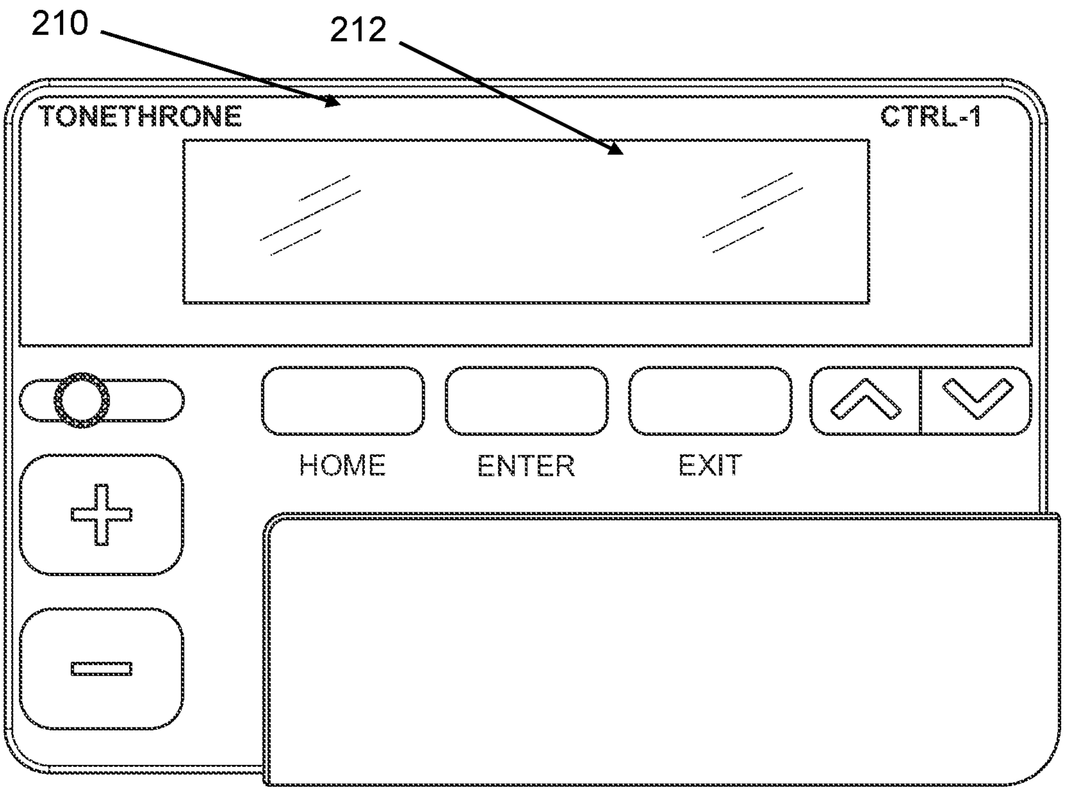
FIG. 7 is an illustration of the front of the sound module.
Figure 8:
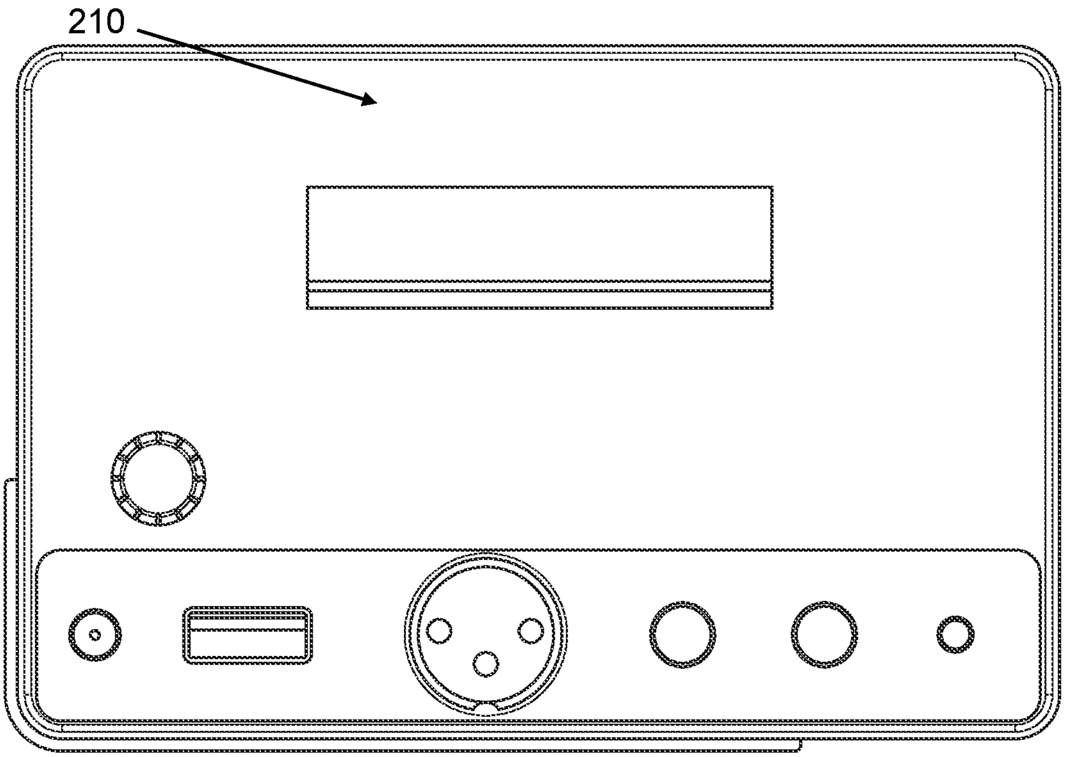
FIG. 8 is an illustration of the rear of the sound module.

Sound module 210 may have a display 212, as illustrated in FIG. 7, set of controls, a set of inputs, and a set of outputs. The various components of music device 100 may be adapted to connect to sound module 210 by way of the electronic lead to an input. Sound module 210 may have input connectors, as illustrated in FIG. 8 such as ports where the cables from the foot triggers are connected as by ¼" jacks, MIDI and USB inputs, or other connectors allow for digital connectivity. Configuring sound module 210 is performed by manipulating the inputs and using the display to view the current configuration and options for sound module 210. Sound module 210 has audio outputs and may be connected to additional equipment such as speakers, computers, amplifiers, and additional electronic modules by way of outputs which may comprise universal serial bus (USB) ports, TRS receptacles, XLR female receptacles, RJ-45 jacks, or other suitable connections.

Base 114 may have control switches on either opposing side of base 114 corresponding to right foot trigger 132 and left foot trigger 134 or a single sound module 210 may be capable of similar operation and configuration. For example, a right control switch may be situated on one side of base 114 to the musician's right and a left control switch may be situated on the other side of base 114 to the musician's left. Each control switch in this embodiment is relatively flat in shape and extends from the back of the base 114 forwardly to the front end of base 114. Right control switch and left control switch may have a control knob allowing the musician to adjust the sounds produced by the electronic drum set to right foot trigger 132 and left foot trigger 134, respectively.

By turning the knob on either control switches or on sound module 210, the musician can select from a range of different drum and cymbal sounds, allowing them to customize the sound of their instrument to their preferences. Additionally, the control knob can be used to adjust the volume and tone of the sounds generated by the electronic drum set. Some sounds may be, but are not limited to, kick, snare, tambourine, clap, hi-hat, cowbell, cabasa sounds. For example, a snare drum sound is assigned to right foot trigger 132 and a cymbal sound may be assigned to left foot trigger 134.

Figure 2:
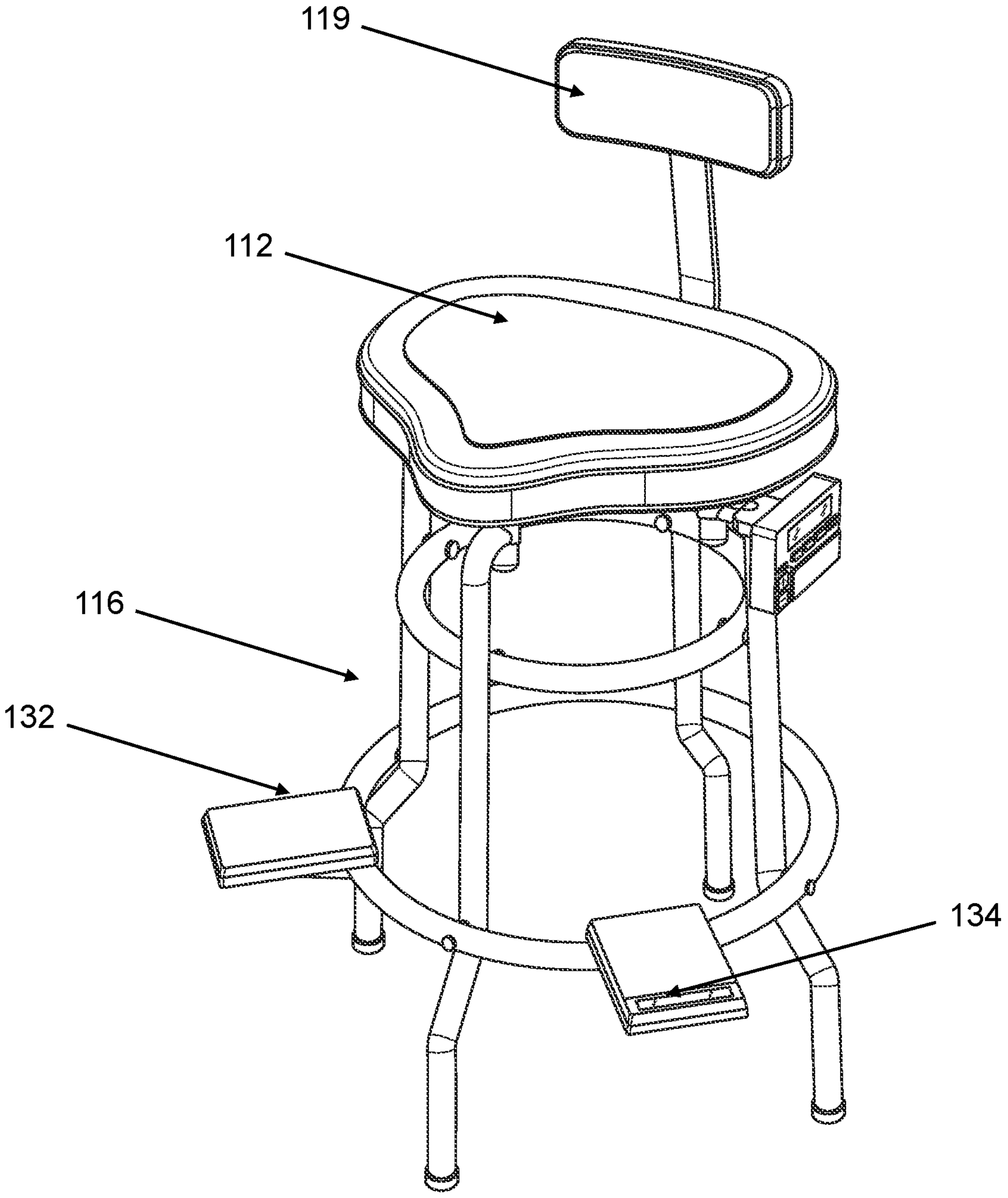
FIG. 2 is another view of the embodiment of the stool.
Figure 3:
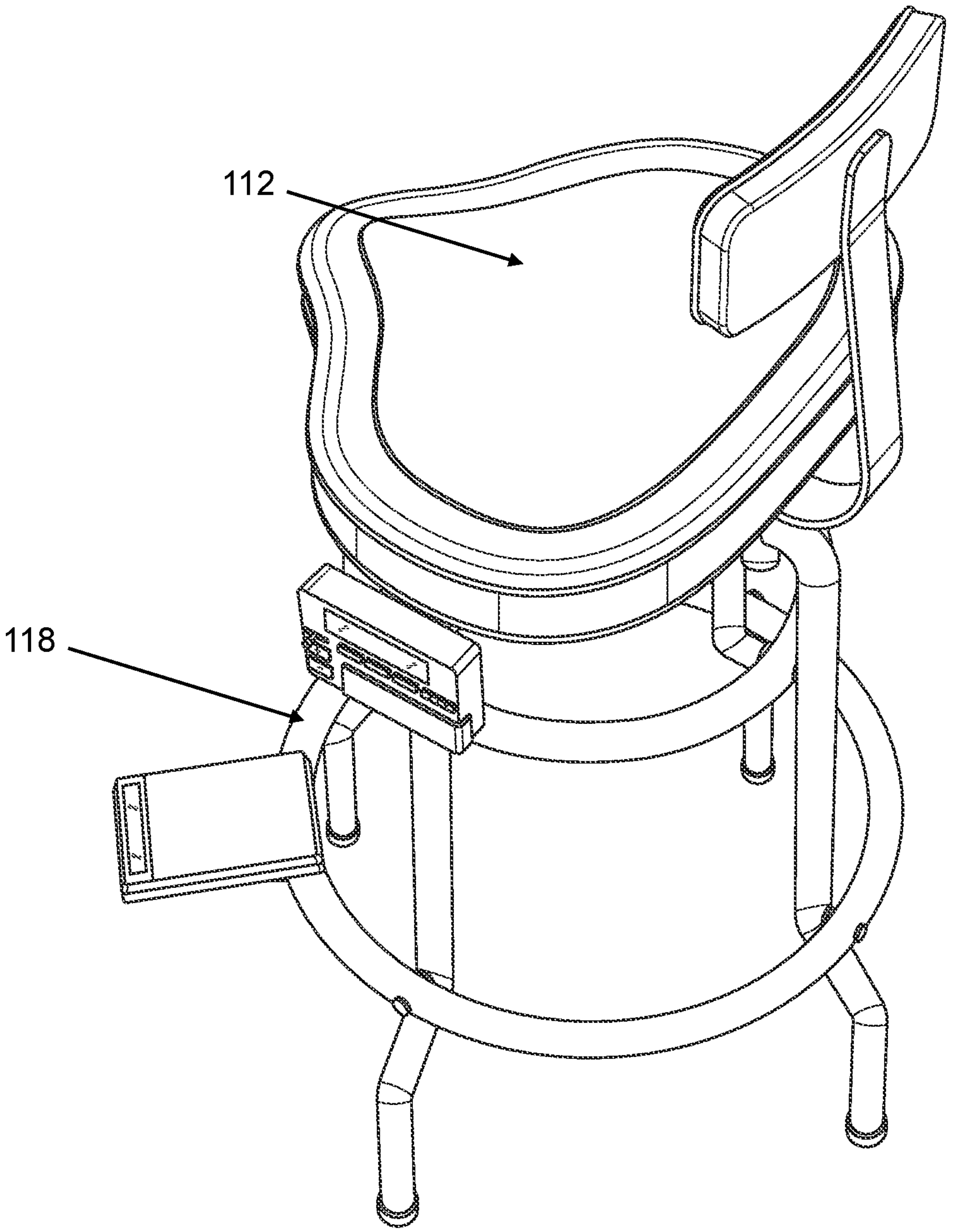
FIG. 3 is another view of the embodiment of the stool.
Figure 4:
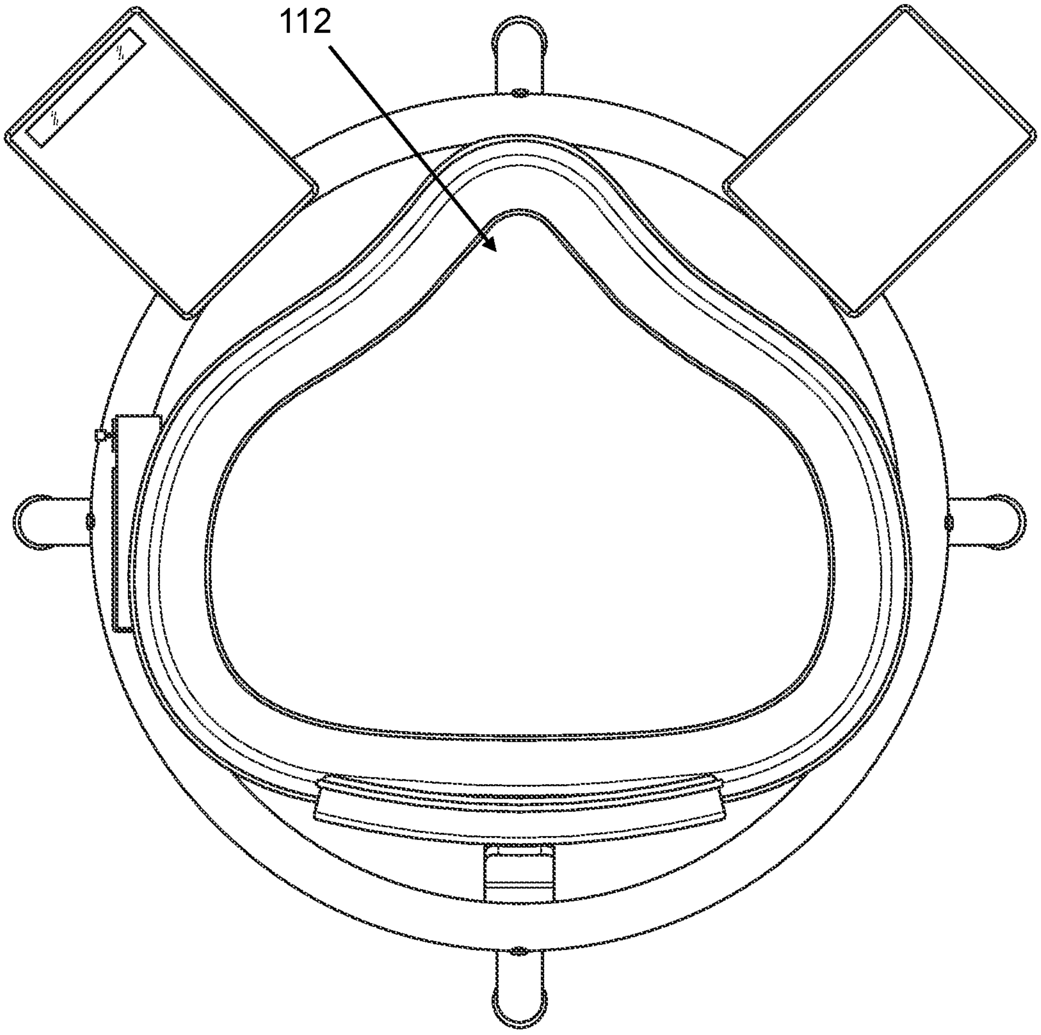
FIG. 4 is another view of the embodiment of the stool.
Figure 5:
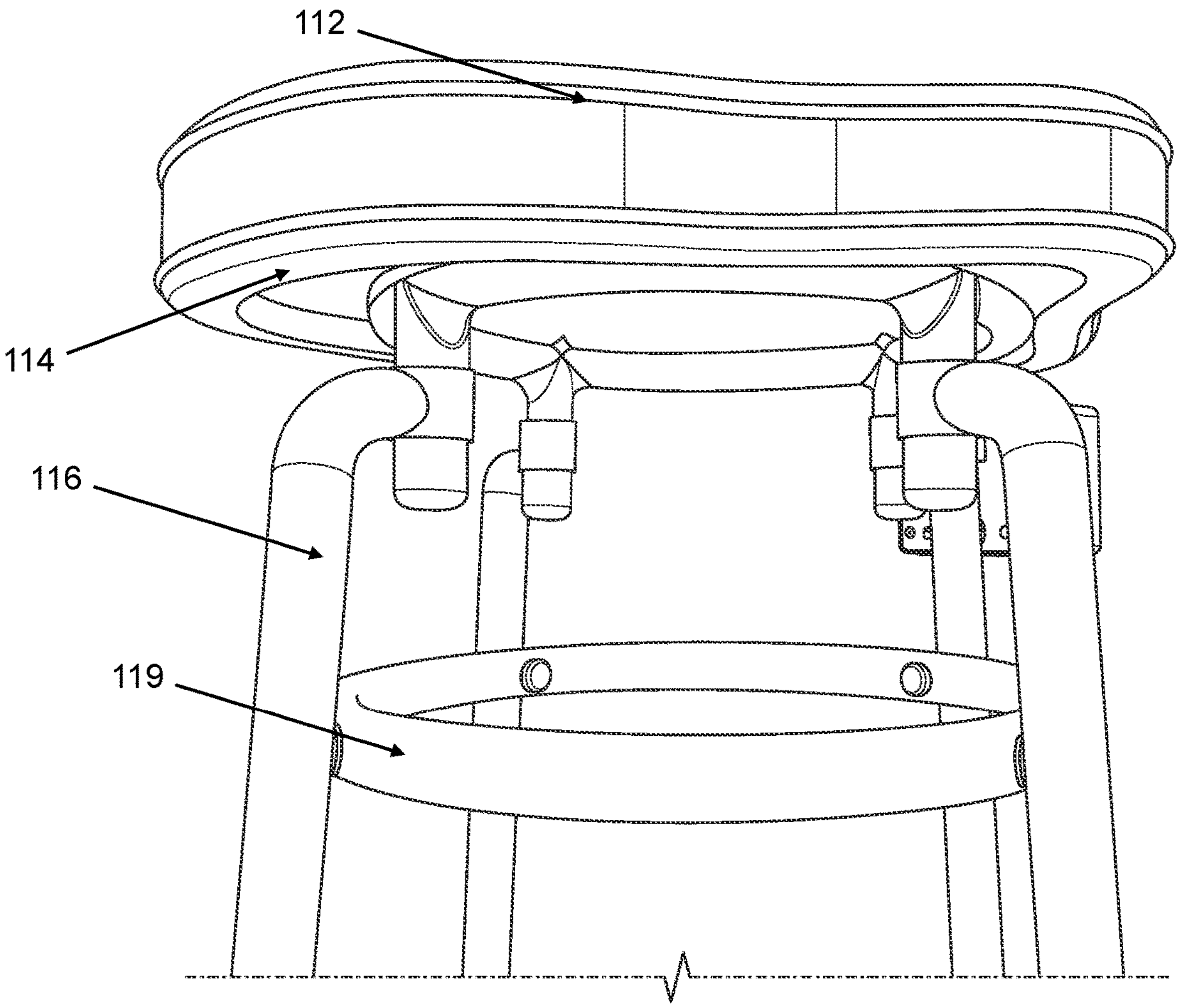
FIG. 5 is another view of the embodiment of the stool.
Figure 6:
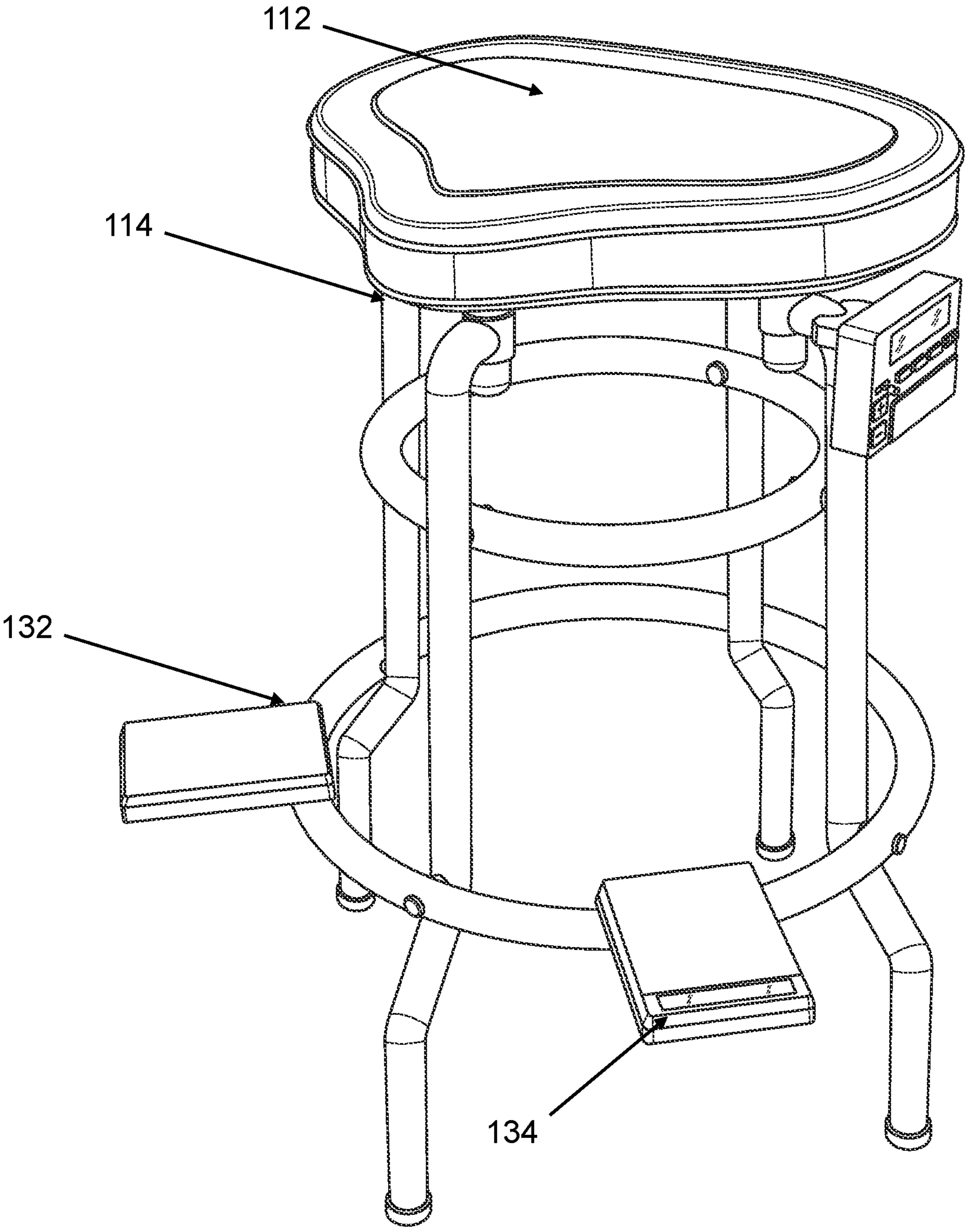
FIG. 6 is another view of the embodiment of the stool.

Right control switch and left control switch are connected to sound module 210, as illustrated in FIG. 2 through one or more cables or wires whereby sound module 210 may be preprogrammed to allow for vary wide variety of drum sound combinations to be assigned to right control switch and left control switch according to the style of music being played, the song being played, or merely the whims of the musician. The sound may then be sent to the output of sound module 210. This may be through headphones for private practice, an amplifier or PA system for live performance, or a recording system.

Sound module 210 may utilize a looper program that creates instant recordings of a musical performance and plays those recordings back in real-time whereby the recordings are stored on one or more databases of sound module 210. This allows a musician to begin overdubbing themselves to create a vast, polyphonic soundscape based on their own performances in the room. In one non-limiting example this may be activated by holding down right foot trigger 132 for one and a half to two seconds. Conversely, holding left foot trigger 144 down will turn off the loop and end the recording. The playback of the recording may then be initiated by holding left foot trigger 144 down or by adjusting the control switches to a specific setting. Of course, it should be appreciated that the left trigger may be used to imitate the recording while the right trigger may be used to end the recording and replay the recording.

To play music device 100 shown in FIG. 1, the musician takes a seat on stool 110 with their feet on right foot trigger 132 and left foot trigger 134. The musician may select a percussion sound by adjusting the control knob on right control switch and left control switch. During performance, the striking of right foot trigger 132 and left foot trigger 134 may be translated by a transducer into an electrical signal.

This signal is received by sound module 210 and sound module 210 determines how to interpret the signal based on the adjustment of right control switch and left control switch from a library of sounds to output to the outputs including a speaker system. The set of settings may be selected from a library of configurations or settings stored in or loaded onto sound module 210.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A music device with a stool having foot pedals that produce sound to an output in response to control switches on a base of the stool, wherein there are two foot pedals, wherein the two foot pedals are positioned on a footrest, wherein the footrest is a circular structure connected to a series of legs that contact with a surface when rested upon.

2. The music device of claim 1, wherein the legs are connected to the base which is positioned above the footrest wherein the control switches are on the base.

3. The music device of claim 2, wherein there is a control switch is positioned a side of the base.

4. The music device of claim 3, wherein a seat cushion is positioned directly above the base.

5. The music device of claim 1, wherein the two foot pedals are wedge shaped.

6. A music device comprising: a stool;

a control switch; and a right foot trigger and left foot trigger that produce electronic drum sounds in response to the control switch, wherein two foot triggers are positioned on a footrest, wherein the footrest is a circular structure connected to a series of legs that contact with a surface when rested upon.

7. The music device of claim 6, wherein the legs are connected to a base positioned above the footrest wherein the control switch are on the base.

8. The music device of claim 6, wherein the control switch has a control knob connected to a sound module to adjust sounds produced by an electronic drum set to the right foot trigger and the left foot trigger.

9. The music device of claim 8, wherein the sounds are kick, snare, tambourine, clap, hi-hat, cowbell, or cabasa sounds.

10. The music device of claim 9, wherein the sounds are configured to be different on the right foot trigger and the left foot trigger.

11. The music device of claim 9, wherein the sound module is configured to create recordings of a music performance, wherein a recording is started by holding down the right foot trigger or the left foot trigger for a predetermined amount of seconds.

12. The music device of claim 11, wherein the predetermined amount of seconds is one and a half to two seconds.

13. The music device of claim 12, wherein the recording is ended by holding down the other foot trigger for the predetermined amount of seconds.

14. The music device of claim 13, wherein the recording is replayed by holding down the other foot trigger for the predetermined amount of seconds.

15. A music device with a stool having a foot pedal that produces sound to an output in response to control switches on a base of the stool, wherein the foot pedal is positioned on the stool, wherein the stool has a series of legs that contact with a surface when rested upon.

16. The music device of claim 15, wherein the stool has a second foot pedal positioned on the stool.

17. The music device of claim 16, further comprising a control panel on the stool.

18. The music device of claim 17, the control panel having a sound module that is configured to create recordings of a music performance, wherein a recording is started by holding down the foot pedal for a predetermined amount of seconds.

19. The music device of claim 18, wherein the recording is ended by holding down the second foot pedal for the predetermined amount of seconds.

20. The music device of claim 19, wherein the recording is replayed by holding down the second foot pedal for the predetermined amount of seconds.

* * * * *